United States Patent [19]

Kirigaya

[11] Patent Number: 5,184,173
[45] Date of Patent: * Feb. 2, 1993

[54] PROTECTING APPARATUS OF DISPLAYING PORTION OF PHOTOGRAPHING DATA IN CAMERA

[75] Inventor: Tadayuki Kirigaya, Tokyo, Japan

[73] Assignee: Asahi Kogaku Kogyo Kabushiki Kaisha, Tokyo, Japan

[*] Notice: The portion of the term of this patent subsequent to Feb. 20, 2007 has been disclaimed.

[21] Appl. No.: 779,158

[22] Filed: Oct. 21, 1991

Related U.S. Application Data

[63] Continuation of Ser. No. 444,809, Dec. 1, 1989, abandoned, which is a continuation of Ser. No. 172,212, Mar. 23, 1988, Pat. No. 4,903,062.

[30] Foreign Application Priority Data

Mar. 26, 1987 [JP] Japan .................................. 62-44832

[51] Int. Cl.⁵ .............................................. C03B 17/18
[52] U.S. Cl. .................................... 354/471; 354/484; 354/289.12
[58] Field of Search .................. 354/465, 471–475, 354/219, 225, 288, 289.1, 289.12, 484, 202, 188, 219, 187, 469, 470, 149.11, 151

[56] References Cited

U.S. PATENT DOCUMENTS

| | | | |
|---|---|---|---|
| 2,048,773 | 7/1936 | Baumgartner | 354/151 |
| 2,122,865 | 7/1938 | Kuppenbender | 354/469 |
| 2,297,634 | 9/1942 | Pritschow | 354/151 |
| 2,714,844 | 8/1955 | Heidecke | 354/151 |
| 2,741,964 | 4/1956 | Lachmann | 354/151 |
| 4,005,460 | 1/1977 | Mizukawa | 354/202 |
| 4,166,682 | 4/1979 | Schrader | 354/219 X |
| 4,465,355 | 8/1984 | Murakami et al. | 354/475 |
| 4,483,601 | 11/1984 | Sekida et al. | 354/288 |
| 4,522,478 | 6/1985 | Kando et al. | 354/288 |
| 4,560,261 | 12/1985 | Ueda et al. | 354/471 |
| 4,560,264 | 12/1985 | Kitazawa et al. | 354/289.1 X |
| 4,575,213 | 3/1986 | Kawano | 354/474 |
| 4,621,914 | 11/1986 | Taniguchi et al. | 354/475 X |
| 4,893,140 | 1/1990 | Yamamoto et al. | 354/149.11 |
| 5,051,770 | 9/1991 | Cornuejols | 354/474 X |

Primary Examiner—W. B. Perkey
Attorney, Agent, or Firm—Sandler, Greenblum & Bernstein

[57] ABSTRACT

An apparatus for protecting the photographing data display portion of in a camera having a protecting cover which covers the photographing data display portion. The protective cover can close and open the photographing data displaying portion.

21 Claims, 14 Drawing Sheets

PROTECTING APPARATUS OF DISPLAYING PORTION OF PHOTOGRAPHING DATA IN CAMERA

This application is a continuation of application Ser. No. 444,809, filed Dec. 1, 1989, now abandoned, which is a continuation of application Ser. No. 172,212, filed Mar. 23, 1988, which is now U.S. Pat. No. 4,903,062 issued Feb. 20, 1990.

BACKGROUND OF THE INVENTION

1. Field of the Invention

The present invention relates to an apparatus for protecting a display for photographing data in a camera, and more precisely it relates to a protecting apparatus for a large liquid crystal, EL or LED panel in a single lens reflex camera.

2. Description of Related Art

In recent automatic and electronic cameras, the exposure control, the focus adjustment, film winding and rewinding, setting of film sensitivity, and control of strobe illumination can be automatically effected, and operational modes, such as shutter priority, diaphragm priority, and program automation, and shutter modes, such as single photography, continuous photography, and timer photographing can be selected.

To give the necessary photographing data to an operator, especially in a single lens reflex camera, a large displaying portion is provided, as disclosed, for example, in U.S. Pat No. 4,483,601 or U.S. Ser. No. 934,055, which will be assigned to the assignee of the present application.

FIG. 15 shows a known large display portion disclosed in the above-mentioned prior art, in which a liquid crystal panel 84 which forms a displaying portion is provided on a pentagonal prism housing 82 of a camera body 80.

However, foreign matter or the like tends to collide with the liquid crystal panel 84, resulting in damage to, or breakage of, the panel. The tendency increases as the panel becomes larger.

SUMMARY OF THE INVENTION

The primary object of the present invention is to eliminate the aforementioned drawback by providing a simple apparatus for protecting the photographing data display portion of a camera.

To achieve the object mentioned above, the protecting apparatus according to the present invention has a protecting cover which is preferably capable of opening and closing on the photographing data display portion provided on a camera body. The protecting cover may be immovable if it is at least partially transparent, and if not, it is, for example, of a slidable or rotatable type.

With the arrangement mentioned above, the photographing data display portion can be protected by the protecting cover, so that no foreign matter can come into collision therewith.

BRIEF DESCRIPTION OF THE ACCOMPANYING DRAWINGS

The invention will be described below in detail with reference to the accompanying drawings, in which.

DETAILED DESCRIPTION OF EMBODIMENTS

Figure 1:
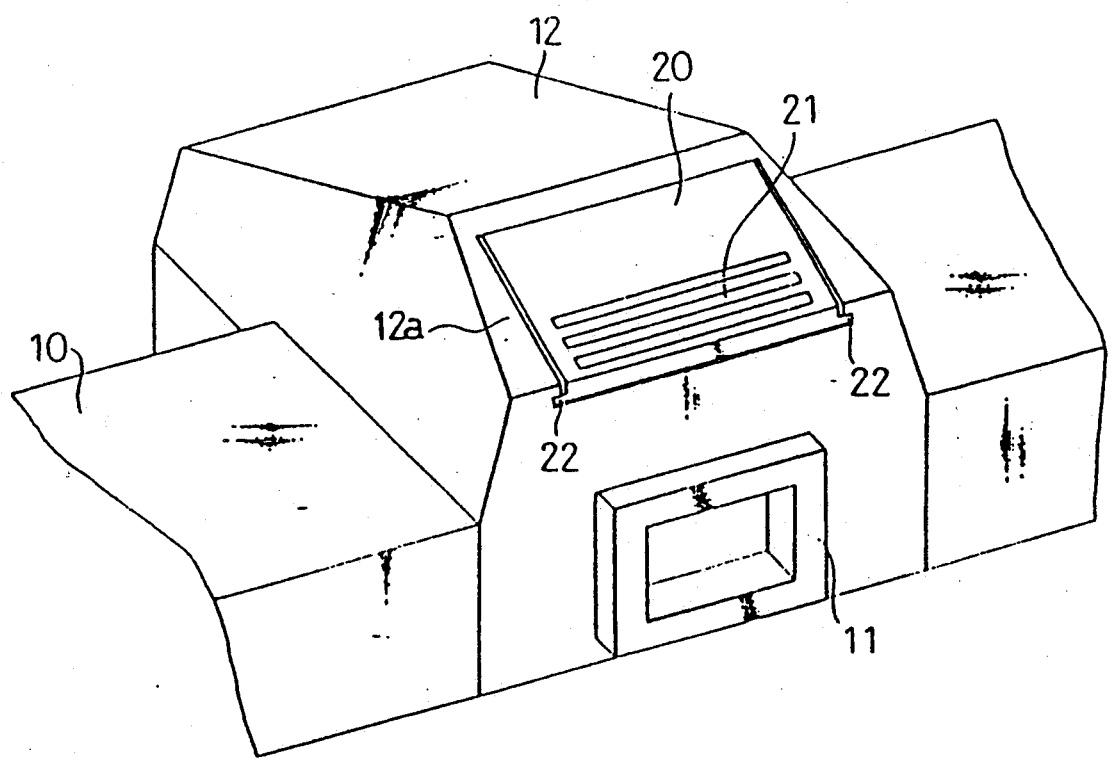
FIG. 1 is a perspective view of a protecting cover which is provided on an upper portion of a single lens reflex camera, according to a first embodiment of the present invention.
Figure 2:
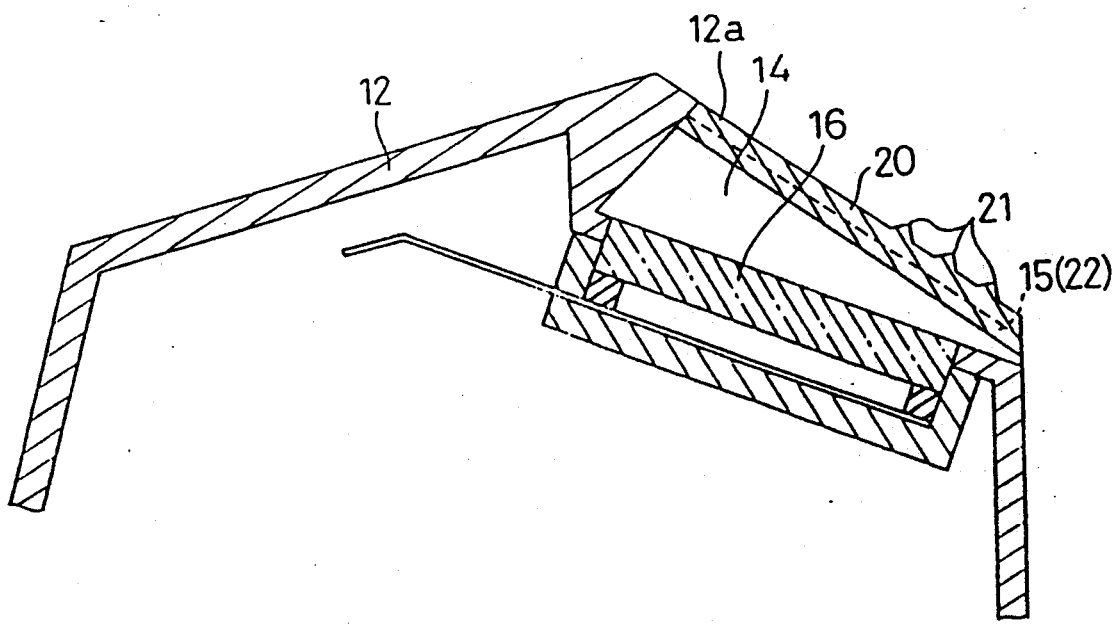
FIG. 2 is a longitudinal sectional view of the single lens reflex camera shown in FIG. 1, taken along a plane including the optical axis thereof.
Figure 3:
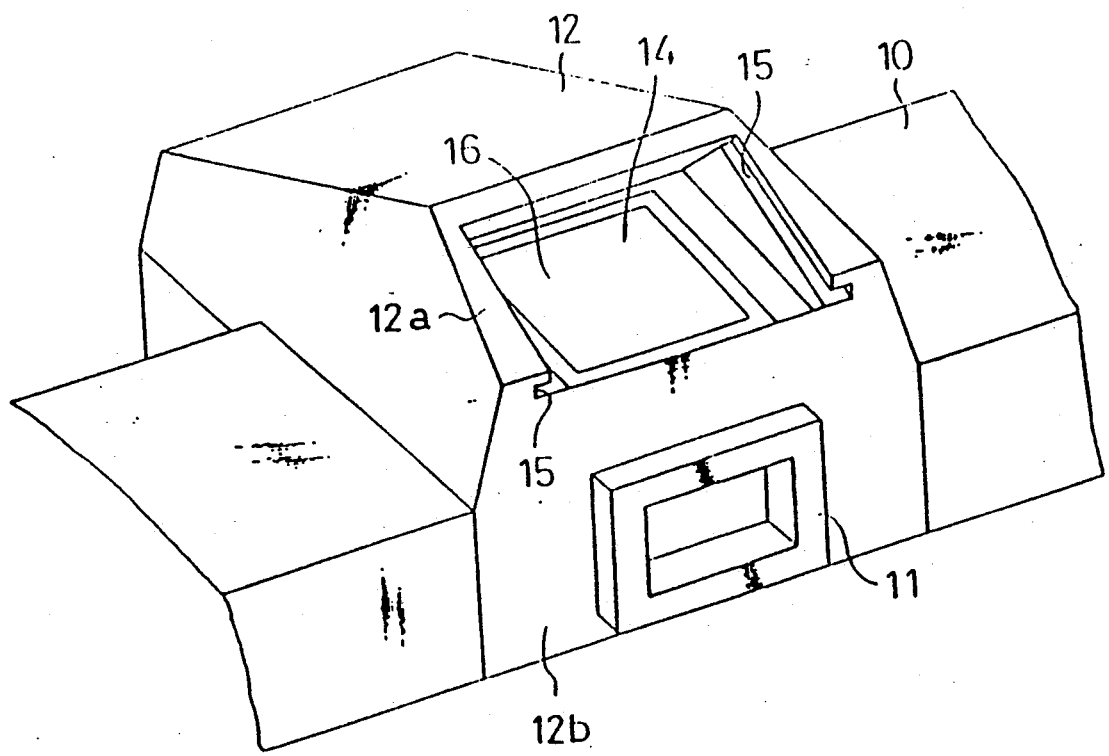
FIG. 3 is a perspective view of the single lens reflex camera shown in FIG. 1, with a removed slidable protecting cover.

With reference to FIGS. 1, 2, 3, 4A and 4B, which show the first embodiment of the present invention, a camera body 10 has a pentagonal prism housing 12 which is provided, on its rear upper portion, with a recess 14 in which a liquid crystal panel 16 is provided along the bottom of the recess 14 (FIGS. 2 and 3). The upper side wall portions of recess 14 that are located on the opposite sides of the liquid crystal panel 16 are provided with parallel guide grooves 15, 15 which extend in parallel with an inclined rear upper surface 12a of the pentagonal prism housing 12, as can be seen in FIG. 3. The rear end portions (lower ends) of the guide grooves 15 open into a rear surface 12b of the pentagonal prism housing 12 above a finder eyepiece frame 11 (FIG. 3).

A slidable protecting cover 20 is inserted in the guide grooves 15 from the open ends (lower ends) of the, so that the recess 14 can be closed by the slidable protecting cover 20 (see FIG. 1). Namely, the liquid crystal panel 16 is covered and protected by the slidable protecting cover 20.

Figure 4A:
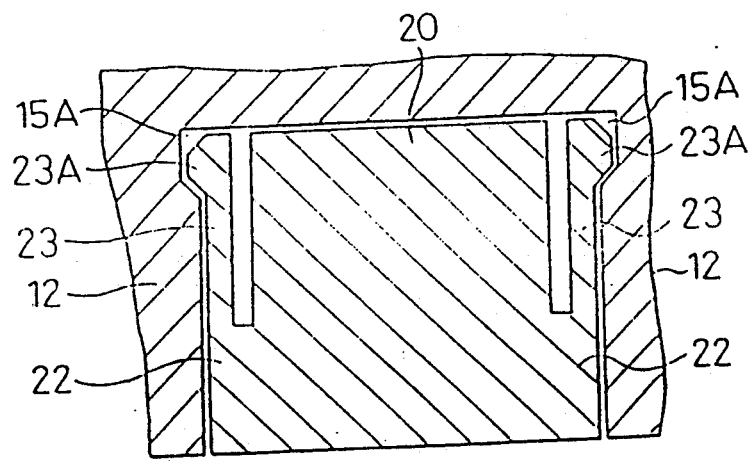
FIGS. 4A and 4B are partial cross sectional and longitudinal sectional views of a slidable protecting cover, respectively.
Figure 4B:
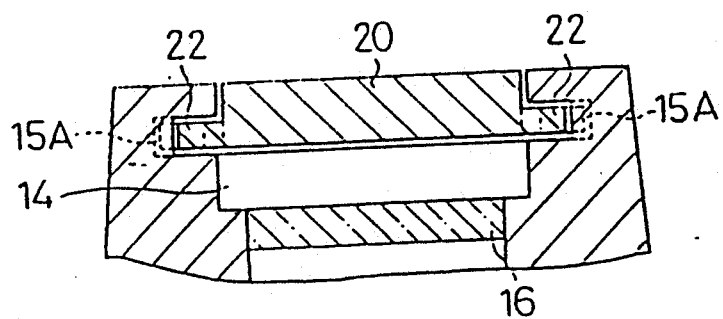

The slidable protecting cover 20 has projections 22 on the opposite side lower ends and arms 23 connected to the associated projections in the longitudinal direction of the projections, as shown in FIG. 4A. The projections 22 project outward, so that they can be fitted into the guide grooves 15. The arms 23 are elastically deformable inward. The arms 23 have at the front free ends thereof projecting abutments 23A which project outward. The projecting abutments 23A are brought into slide contact with the bottoms of the guide grooves 15 when inserted in the guide grooves 15, so that when the slidable protecting cover 20 completely closes the recess 14, the projecting abutments 23A are fitted in corresponding recesses 15A formed in the bottom portions of the guide grooves 15 to hold the protecting cover 20 in a closed position in which the recess 14 is closed by the slidable protecting cover 20.

When the slidable protecting cover 20 is removed from the recess 14 to see the displayed information of the liquid crystal panel 16, an operator puts his or her finger on frictional ridges 21 which are provided on the upper surface of the slidable protecting cover 20 to slide the cover 20 down. Until the projecting abutments 23A are disengaged from the corresponding recesses 15A as a result of a flexible deformation of the arms 23, it is necessary to slide the cover 20 with a relatively large force. However, once the projecting abutments 23A are disengaged from the corresponding recesses 15A, the slidable protecting cover 20 can be easily pulled out from grooves 15 with a smaller force.

Figure 5:
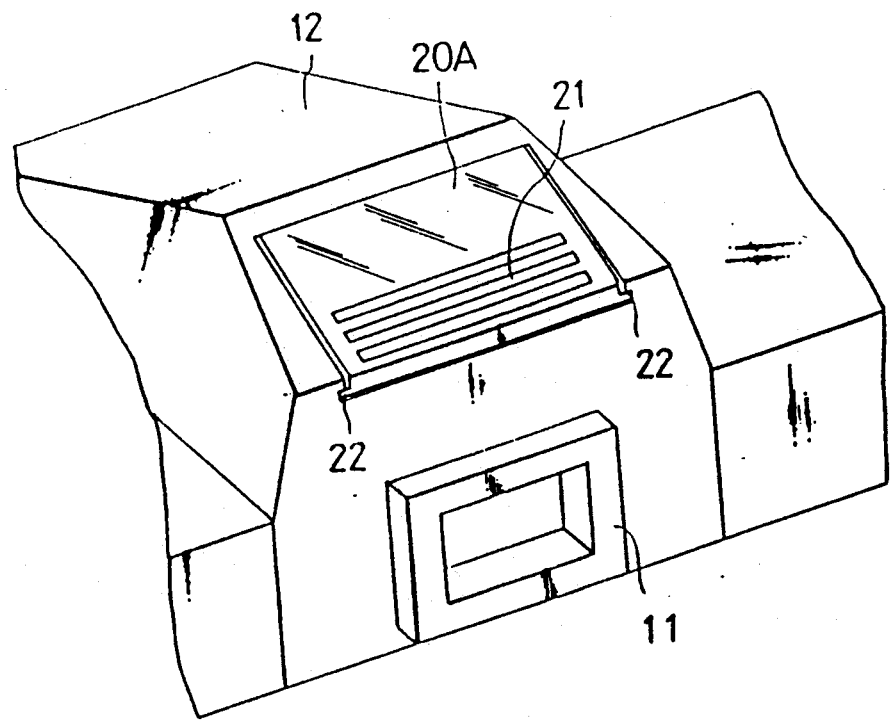
FIG. 5 is a perspective view of a variant of FIG. 1.

FIG. 5 shows a transparent slidable protecting cover 20A. In this variant, it is possible to see the photographing data through the transparent protecting cover 20A without sliding the latter.

Figure 6:
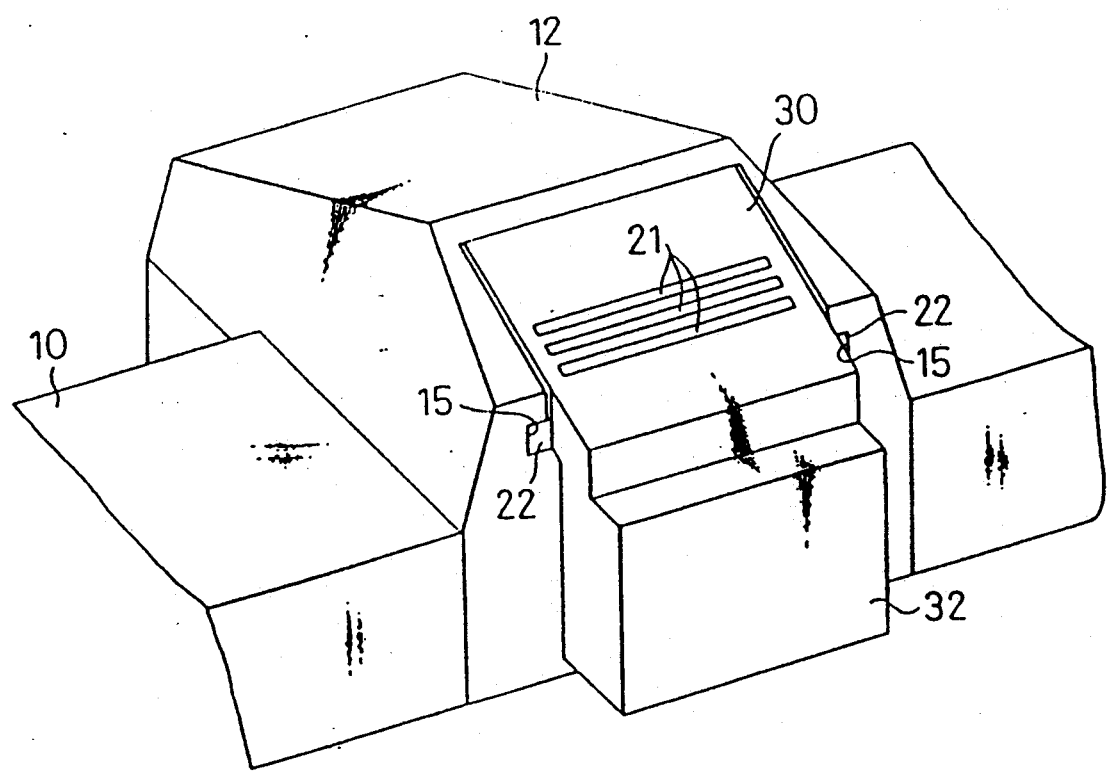
FIGS. 6 and 7 are views similar to FIGS. 1 and 2, according to a second embodiment of the present invention, respectively.
Figure 7:
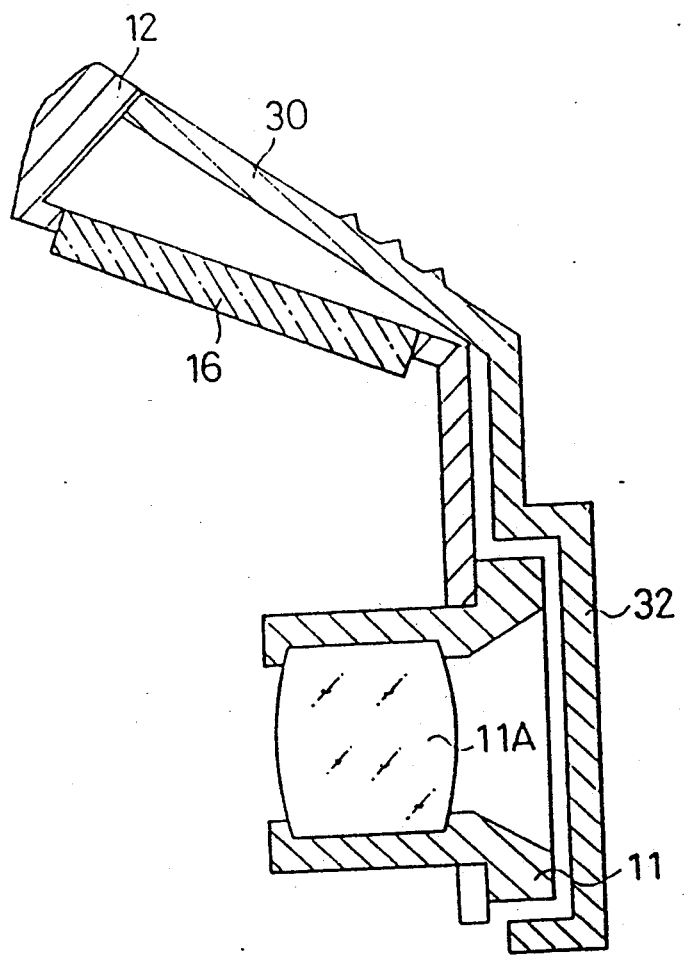

FIGS. 6 and 7 show a second embodiment of the present invention, in which a slidable protecting cover 30 is integral with a cap 32 for preventing the light from being incident in the camera body from the finder. The construction of the slidable protecting cover 30 is substantially the same as that of the slidable protecting cover 20 in the aforementioned first embodiment, except for the integrated cap 32. The cap 32 covers the rear portion of the finder eyepiece frame 11 to prevent the incident light from the finder from entering when the slidable protecting cover 30 completely closes the recess 14.

Figure 8:
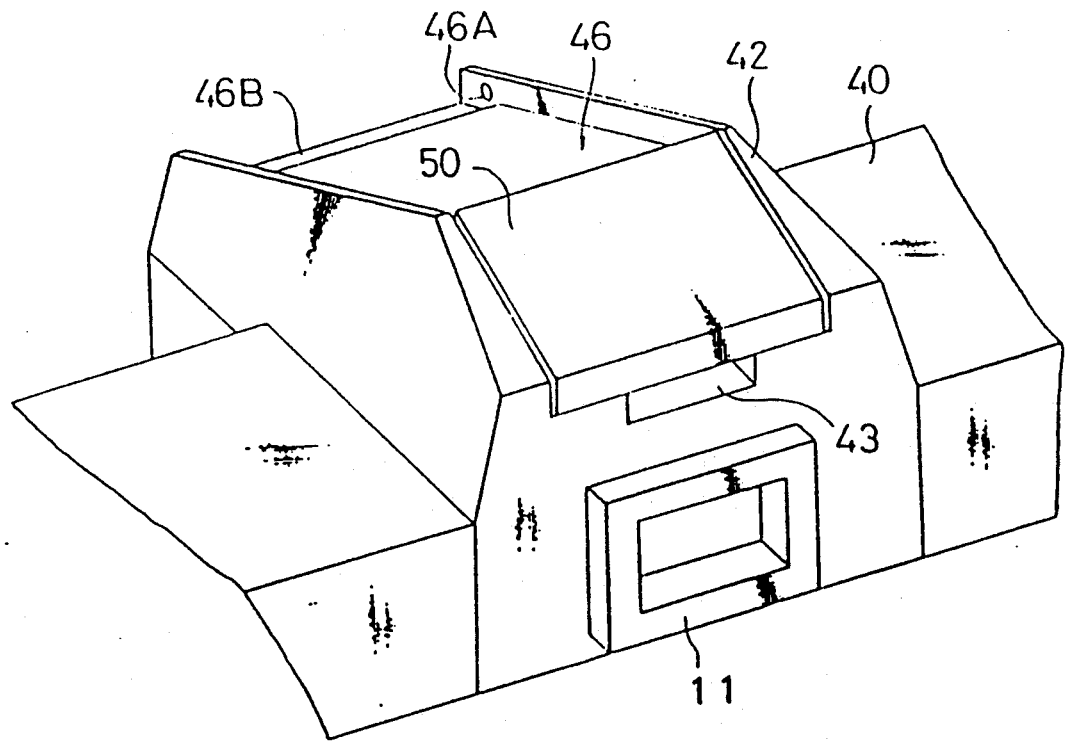
FIGS. 8 and 9 are views similar to FIGS. 1 and 2, according to a third embodiment of the present invention, respectively.
Figure 10:
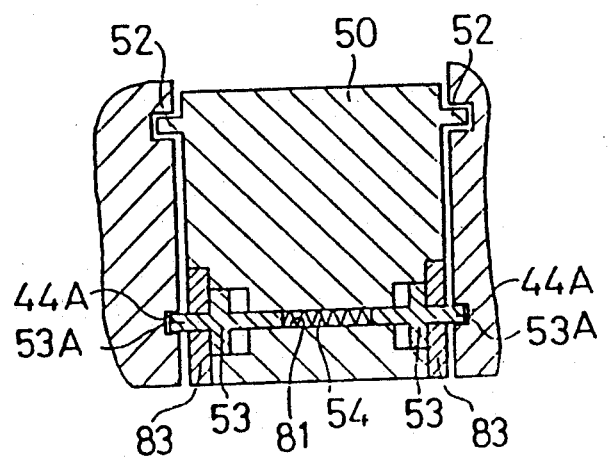
FIG. 10 is a sectional view of the rotatable protecting cover of the third embodiment illustrated in FIGS. 8 and 9.
Figure 9:
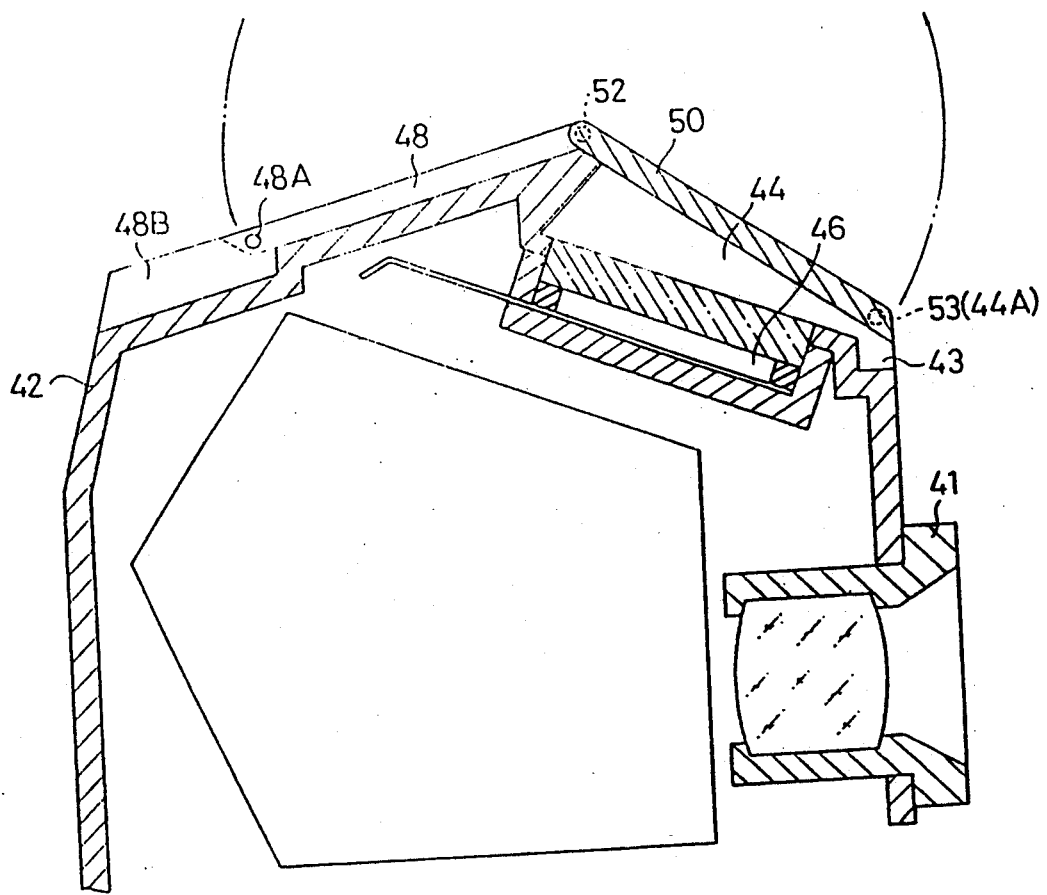

In FIGS. 8 to 10, which show a third embodiment of the present invention, the slidable protecting cover 20 or 30 in the above-mentioned embodiments is replaced with a rotatable protecting cover 50. On the upper surface of the pentagonal prism housing 42 of the camera body 40 are formed continuous recesses 44 and 48 which are interconnected by a bordering ridge. The liquid crystal 46 is embedded in the bottom of the rear recess 44. The rotatable protecting cover 50 is rotatably attached to the pentagonal prism housing 42 by means of a shaft 52 which extends substantially along with the bordering ridge of the recesses 44 and 48. so that the rotatable protecting cover 50 can be rotated between a first rotational position in which the cover 50 is located in the rear recess 44 and a second rotational position in which the cover 50 is located in the front recess 48.

The rotatable protecting cover 50 is provided, on its free end (lower end in FIGS. 8–10), with stop pins 53 which are axially biased by a compression spring 54 provided in a stepped hole 81, and which extends parallel to the shaft 52 of rotatable protecting cover 50. Namely, the stop pins 53 are located in the stepped hole portions with a larger diameter, so that the stop pins are continuously biased outwardly in opposite directions, by spring 54. The pins 53 are prevented from coming out from the stepped hole 81 by keeper plates 83, which are secured to the rotatable protecting cover 50. Semispherical front ends (outer ends) 53A of pins 53 project outwardly from stepped hole 81, so that the front ends 53A can be disengageably engaged in corresponding holes 44A which are formed in the side walls of recess 44. Pins 53 form, together with the corresponding holes 44A, a so-called click stop. When the pins 53 are engaged in the corresponding holes 44A by the spring force of the compression spring 54, the rotatable protecting cover 50 which covers the liquid crystal panel 46 is firmly held in the closed position. Namely, the rotatable protecting cover 50 is prevented from accidentally opening by the above-mentioned click stop mechanism.

Holes 48A, similar to the holes 44A, are provided in the side walls of the front recess 48 so as to form a similar click stop mechanism. Namely, when the rotatable protecting cover 50 is rotated about the shaft 52 to come to the second rotational position in which the cover 50 covers the front recess 48, the stop pins 53 are engaged in the corresponding holes 48A to hold the rotatable protecting cover 50 in an open position.

When a user sees the necessary information in the liquid crystal panel 46, the user puts his or her finger in an insertion opening 43 (FIGS. 8 and 9) which is formed in the pentagonal prism housing 42 as a part of the rear recess 44, which is located below the rotatable protecting cover 50 which is in the closed position (first rotational position) so as to rotate the rotatable protecting cover 50 about the shaft 52 to open the cover 50. A relatively strong rotational force is needed to rotate and open the rotatable protecting cover 50 from the closed position so as to disengage the stop pins 53 from the corresponding holes 44A against the spring force of compression spring 54. The disengagement of stop pins 53 from the corresponding holes 44A is made possible by the semispherical front ends 53A of the stop pins 53.

Once the stop pins 53 are disengaged from the corresponding holes 44A, the rotatable protecting cover 50 can be easily rotated to the second rotational position (open position) in which the cover 50 is positioned in the front recess 48 with a smaller rotational force.

When the rotatable protecting cover 50 approaches the extremity of the second rotational position (i.e., the open position), namely when the rotatable protecting cover 50 comes between the opposite side walls of the front recess 48, it is necessary to force the rotatable protecting cover 50 down with a relatively large force until the stop pins 53 are engaged in the corresponding holes 48A. When the engagement of the stop pins 53 in the corresponding holes 48A is established, the rotatable protecting cover 50 is firmly held in the open position (second rotational position) by the click stop mechanism. It should be appreciated that the front recess 48 is provided, on its front end, with a stepped opening portion 48B (FIG. 9) in which a user's finger is inserted when the rotatable protecting cover 50 is rotated from the open position (second rotational postion) toward the closed position (first rotational position).

Figure 11:
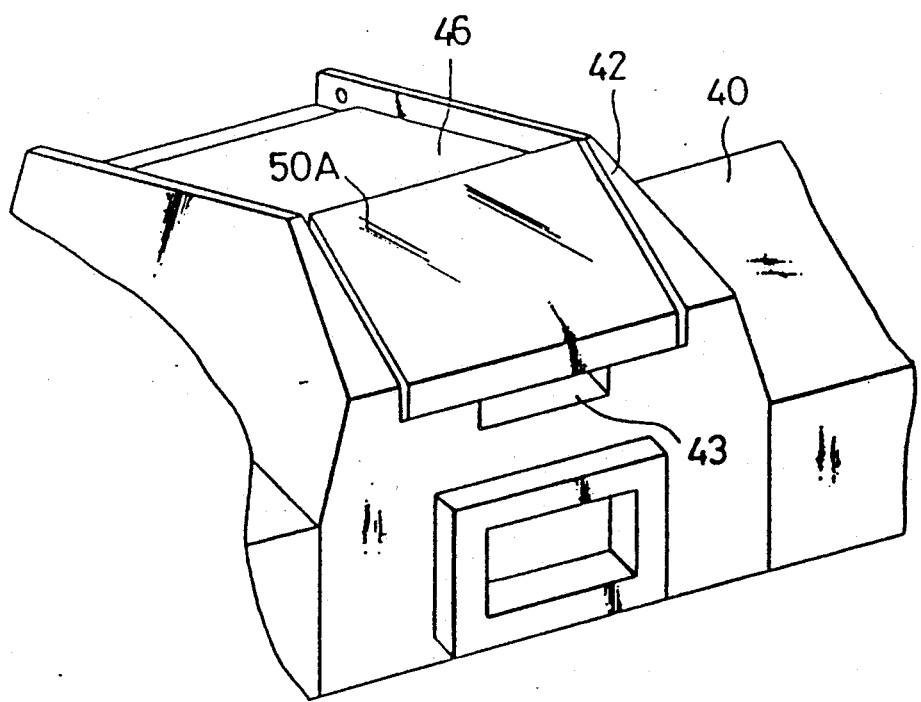
FIG. 11 is a perspective view of a variant of FIG. 8.

FIG. 11 shows a transparent rotatable protecting cover 50A. In this variant, it is possible to see the photographing data on the liquid crystal through the transparent protecting cover 50A without rotating the cover.

Figure 12:
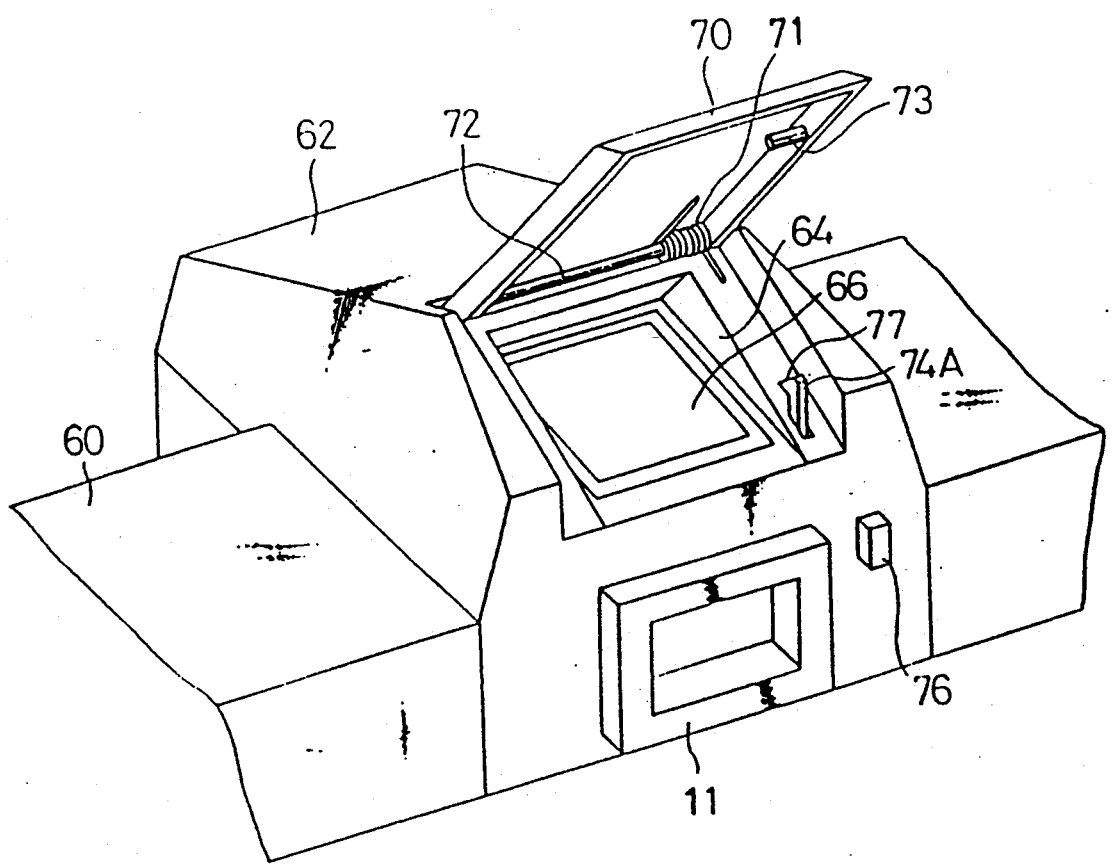
FIG. 12 is a view similar to FIG. 1, according to a fourth embodiment of the present invention.
Figure 13:
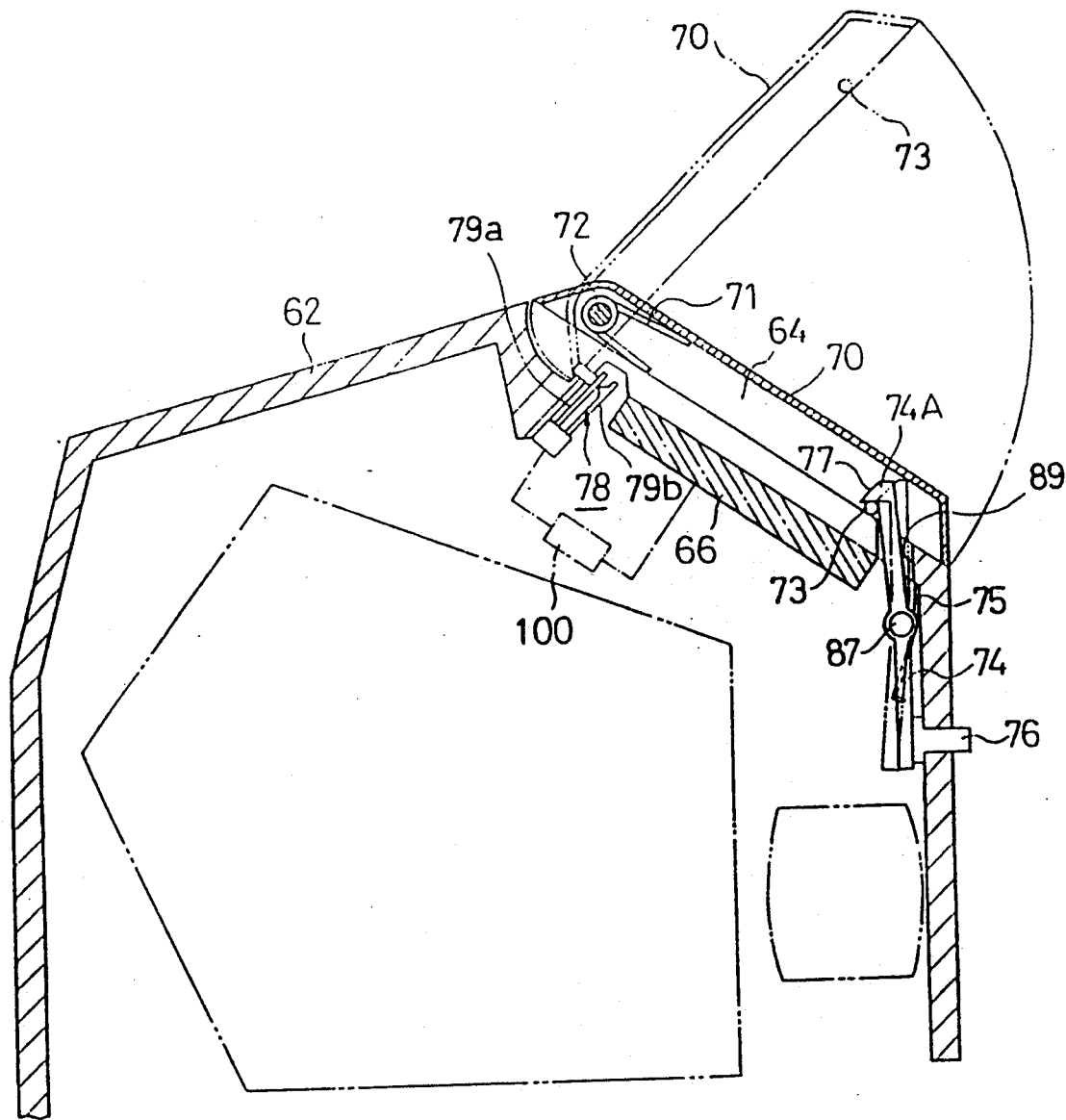
FIG. 13 is a partial longitudinal sectional view of a single lens reflex camera shown in FIG. 12, taken along a plane passing through a lock pin of a rotatable protecting cover.

FIGS. 12 and 13 show a fourth embodiment of the protecting cover according to the present invention.

In FIGS. 12 and 13, the pentagonal prism housing 62 of the camera body 60 is provided, on its rear upper surface, with a recess 64 which has the liquid crystal panel 66 embedded in the bottom thereof. The recess 66 can be closed by a rotatable protecting cover 70 which is rotatable about a shaft 72 between a closed positions (first rotational position) and an open position (second rotational positions). The rotatable protecting cover 70 is continuously biased toward the open postion by means of a torsion spring 71 coiled around the shaft 72. The rotable protecting cover 70 has a lock pin 73 provided on the inner side face thereof in the vicinity of the front edge of cover 70.

The pentagonal prism housing 62 has a lever 74 which is pivoted thereto by means of a pivot shaft 87 and which passes through a through hole 89 formed in the bottom of the recess 64 in the vicinity of the rear edge thereof. The lever 74 has at its projecting upper (outer) end a hook 74A which can be engaged by the lock pin 73 of the rotatable protecting cover 70. The lever 74 is continuously biased toward a locked position in which hook 74A is engaged by the lock pin 73, by a torsion spring 75 which is coiled around the pivot shaft 87. Hook 74A has an inclined upper surface portion 77 which enables lever 74 to easily move to an unlocked position in which the lock pin 73 is disengaged from the hook 74A, when lever 74 is pressed by the lock pin 73. Namely, when the rotatable protecting cover 70 is brought into the closed postion (first rotational positions) against the torsion spring 71, the lock pin 73 comes into abutment with the hook 74A, so that lever 74 will tend to be pressed downwardly by the lock pin 73. In this moment, due to the inclination of the inclined upper surface portion 77, the lever easily rotates about the pivot shaft 87, so that the lock pin 73 can move under the hook 74A, while causing a slight angular displacement of the lever 74. After the lock pin 73 comes under the hook 74A, the lever 74 is automatically returned to its initial position (i.e., its locked position) by the spring force of the torsion spring 75, as shown in FIG. 11, so that the lock pin 73 is engaged by the hook 74A in order to lock the rotatable protecting cover 70 in the closed positions.

On the rear side face of the pentagonal prism housing 62 is provided a release button (i.e., a push button) 76 which extends therethrough to project outwardly therefrom. The inner end of the release button 76 abuts against the lower end of the lever 74, as can be seen in FIG. 11, so that when the release button 76 is pressed inwardly, the lever 74 will rotate about pivot shaft 87, against the torsion spring 75, so as to disengage hook 74A from lock pin 73. As a result, the rotatable protecting cover 70 is automatically brought into the second rotational positions, i.e., the open position, by the spring force of the torsion spring 75.

An electrical switch 78 having a movable contact 79a and a stationary contact 79b is provided on the pentagonal prism housing 62 at the front portion of the recess 64. The electrical switch 78 is turned ON only when the movable contact 79a comes into contact with the stationary contact 70b. The movable contact 79a is pressed toward the stationary contact 70b by the front end of the rotatable protecting cover 70 when the cover 70 is brought into the open position, so that an electrical connection will be established between the two contact 70a and 70b. Namely, the switch 78 is turned ON only when the rotatable protecting cover 70 is in the open position. The switch 78 is electrically connected, for example, to an electrical power circuit (battery circuit) 100 of the display portion including the liquid crystal panel 66 of the camera, so that the switch 78 can be used as a main switch for the battery circuit 100 of the display portion of the camera, resulting in decreased power consumption of the battery or batteries.

Although the liquid crystal panel is provided on the pentagonal prism housing of a single lens reflex camera in the illustrated embodiments, the present invention can be applied to a camera in which the liquid crystal panel is provided on another portion of the camera.

Figure 14:
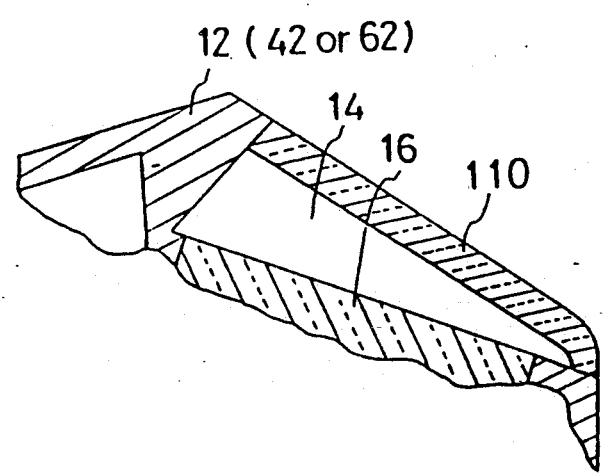
FIG. 14 is a partial longitudinal sectional view of an immovable transparent protecting cover according to another embodiment of the present invention.
Figure 15:
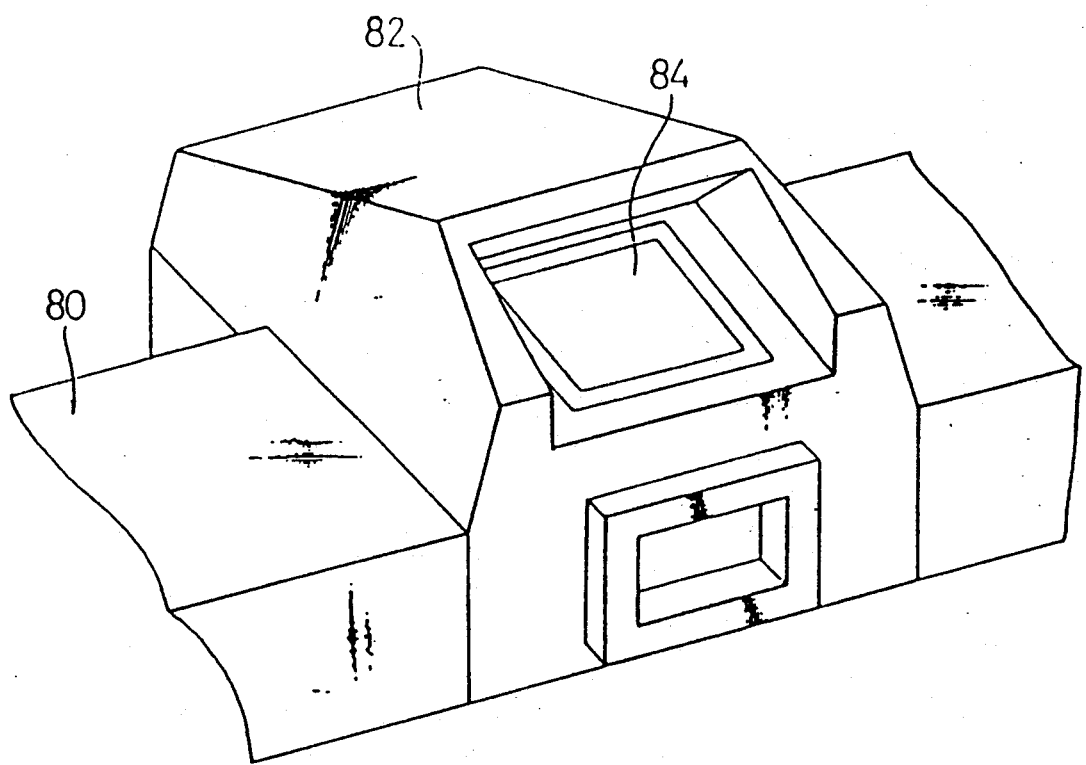
FIG. 15 is a perspective view of an upper portion of a known single lens reflex camera.

It is possible to provide an immovable protecting cover 110 which is partially or entirely transparent, so that the liquid crystal is visible without opening the protecting cover, as shown in FIG. 14. In FIG. 14, the transparent protecting cover 110 is integrally connected to the pentagonal prism housing 12 (42 or 62). It is unnecessary to provide an opening below the protecting cover in which an operator's finger can be inserted to slide or rotate the over, as in the previous embodiments, since the protecting cover 110 is immovable.

It is also possible to provide a cap similar to the cap 32 (FIG. 6) which covers the finder eyepiece frame 11 on the rotatable protecting cover 50 or 70, similarly to the embodiment shown in FIG. 6.

In illustrated embodiments, the liquid crystal panel can be replace with, for example, an EL panel, or LED panel or the like.

As can be understood from the foregoing, according to the present invention, the photographing data displaying portion provided on the camera body is protected by a protecting cover, so that no foreign matter can come into collision with the displaying portion.

I claim:

1. An apparatus for protecting a photographic data display portion of a camera body, said apparatus comprising a protective cover for protecting said photographic data display portion, said protective cover being movable between a closed position in which said photographic data display portion is directly covered and closed by said protective cover and an open position in which said photographic data display portion is uncovered by said protective cover, said camera body comprising a housing with said photographic data display portion being positioned in said housing, wherein said protective cover is rotatably held on said housing, and, in said covered postion, forms a portion of the exterior of said camera body, and connection/disconnection means for connecting said photographic data display portion to a source of power in association with movement of said protective cover to said open position and disconnecting said photographic data display portion from the source of power in association with movement of said protective cover to said closed postion.

2. An apparatus according to claim 1, wherein said connection/disconnection means comprises an electrical switch connected to a battery circuit of the camera, said electrical switch comprising a main switch of the battery circuit.

3. The apparatus for protecting a photographic data display portion according to claim 1, wherein said photographic data display portion comprises an immovable changeable element which display selective photographic data, said photographic data display portion being separate from the photographing image light-path of said camera body.

4. The apparatus for protecting a photographic data display portion according to claim 1, wherein said photographic data display portion comprises an immovable planar display portion positioned externally of the finder of said camera body.

5. The apparatus for protecting a photographic data display portion according to claim 1, said photographic data display portion comprising an immovable planar display area.

6. An apparatus for protecting a photographic data display portion according to claim 1, wherein said photographic data display portion comprises a plurality of fixedly positioned selective information display portions.

7. The apparatus for protecting a photographic data display portion of a camera body according to claim 1, said cover comprising lock means for locking said protective cover in said closed position, said lock means comprising a lock pin on said protective cover and a hook in said housing, said hook being adapted to be engaged by said lock pin.

8. An apparatus according to claim 7, wherein lock means further comprises a lever on which said hook is formed, said lever being movable between a locked postion in which the lock pin is engaged by said hook and an unlocked position in which the lock pin is disengaged from said hook.

9. An apparatus according to claim 8, further comprising means for releasing said lever from said locked postion.

10. The apparatus for protecting a photographic data display portion of a camera body according to claim 1, said connection/disconnection means comprising a switch and a switch actuating member, said switch being positioned on one of said camera body and said protective cover and said switch actuating member being positioned on the other of said camera body and said protective cover.

11. The apparatus for protecting a photographic data display portion of a camera body according to claim 10, said switch comprising a main switch of a battery circuit of said photographic data display portion.

12. The apparatus for protecting a photographic data display portion of a camera body according to claim 10, said switch comprsiign the main switch of a battery circuit of said camera body.

13. An apparatus for protecting a photographic data display portion of a camera body, said photographic data display portion comprising at least one powered immovably changeable element displaying selected photographic data, said apparatus comprising a protective cover for protecting said photographic data display portion, said protective cover being movable between a closed position in which said photographic data display portion is directly covered and closed by said protective cover, and an open position in which said photographic data display portion is uncovered by said protective cover, said camera body comprising a housing upon which said photographic data display portion is positioned, wherein said protective cover forms a portion of the exterior of said camera body, said protective cover comprising connection/disconnection means for connecting said photographic data display portion to a source of power in association with movement of said protective cover to said open postion and disconnecting said photographic data display portion form the source of power in association with movement of said protective cover to said closed postion.

14. The apparatus for protecting a photographic data display portion of a camera body according to claim 13, said protective cover comprising locking means for lock said protective cover in said closed postion, said lock means comprising a lock pin on said protective cover and a hook in said housing, said hook being adapted to be engaged by said lock pin.

15. The apparatus for protecting a photographic data display portion of a camera body according to claim 13, said connection/disconnection means comprising an electrical switch, said switch comprising a main switch of a battery circuit of said photographic data display portion.

16. The apparatus for protecting a photographic data display portion of a camera body according to claim 13, said connection/disconnection means comprising an electrical switch, said electrical switch comprising a main switch of a battery circuit of said camera body.

17. An apparatus for protecting a photographic data display portion of a camera body located external of a finder optical path in said camera body, said photographing data display portion comprising a fixedly positioned, powered, changeable data display portion, means for supplying power to said photographic data display portion, said apparatus comprising a protective cover for protecting said photographic data display portion, said protective cover being moveable between a closed position in which said photographic data display portion is directly covered and closed by said protective cover, and n open postion in which said photographic data display portion is uncovered by said protective cover, said camera body comprising a housing, said photographic data display portion being positioned in said housing, wherein said protective cover is rotatably held on said housing, and, in said covered postion, forms a portion of the exterior of said camera body, and an electrical switch positioned to connect and disconnect a supply of power to said photographic data display portion by said power supplying means in accordance with movement of said protective cover between said opened and closed positions.

18. The apparatus for protecting a photographic data display portion accordingly to 17, wherein said photographic data display portion comprises at least one fixedly positioned changeable data display element.

19. The apparatus for protecting a photographic data display portion of a camera body according to claim 17, said cover comprising lock means for locking said protective cover in said closed positions, said lock means comprising a lock pin on said protective cover and a hook in said housing, said hook being adapted to be engaged by said lock pin.

20. The apparatus for protecting a photographic data display portion of a camera body according to claim 17, said electrical switch comprising a main switch of a power supply circuit of said photographic data display portion.

21. The apparatus for protecting a photographic data display portion of a camera body according to claim 17, said electrical switch comprising a main switch of a battery circuit of said camera body.

* * * * *

UNITED STATES PATENT AND TRADEMARK OFFICE
CERTIFICATE OF CORRECTION

PATENT NO. : 5,184,173

DATED : February 2, 1993

INVENTOR(S) : T. KIRIGAYA et al.

It is certified that error appears in the above-indentified patent and that said Letters Patent is hereby corrected as shown below:

On the cover, in section [56], "References Cited", line 12, change "288" to ---202---.

On the cover, in section [56], "References Cited", line 13, change "471" to ---289.1X---.

At column 6, line 44 (claim 1, line 20) change "postion" to ---position---.

At column 6, line 52 (claim 3, line 3) change "immovable" to ---immovably---.

At column 6, line 53 (claim 3, line 4) change "display" to ---displays---.

At column 7, line 10 (claim 8, line 1) change "wherein lock" to ---wherein said lock---.

At column 7, line 33 (claim 12, line 3) change "comprsiign" to ---comprising---.

At column 7, line 53 (claim 13, line 19) change "postion" to ---position---.

At column 7, line 54 (claim 13, line 20) change "form" to ---from---.

UNITED STATES PATENT AND TRADEMARK OFFICE
CERTIFICATE OF CORRECTION

PATENT NO. : 5,184,173
DATED : February 2, 1993
INVENTOR(S) : T. KIRIGAYA et al.

It is certified that error appears in the above-indentified patent and that said Letters Patent is hereby corrected as shown below:

At column 8, line 1 (claim 14, line 4) change "postion" to ---position---.
At column 8, line 27 (claim 17, line 12) change "n" to ---an---.
At column 8, line 32 (claim 17, line 17) change "postion" to ---position---.
At column 8, line 46 (claim 19, line 4) change "positions" to ---position---.

Signed and Sealed this

Twenty-ninth Day of October 1996

Attest:

BRUCE LEHMAN

Attesting Officer

Commissioner of Patents and Trademarks